W. E. HARDEMAN.
TIRE PRESS.
APPLICATION FILED NOV. 29, 1920.

1,388,255.

Patented Aug. 23, 1921.

2 SHEETS—SHEET 2.

INVENTOR.
W. E. Hardeman
BY J. Edward Maybee.
ATTY.

UNITED STATES PATENT OFFICE.

WILLIAM EDWARD HARDEMAN, OF BIRMINGHAM, ENGLAND, ASSIGNOR TO DUNLOP TIRE & RUBBER CORPORATION OF AMERICA, OF BUFFALO, NEW YORK, A CORPORATION OF NEW YORK.

TIRE-PRESS.

1,388,255.  Specification of Letters Patent.  Patented Aug. 23, 1921.

Application filed November 29, 1920. Serial No. 427,080.

*To all whom it may concern:*

Be it known that I, WILLIAM EDWARD HARDEMAN, of 210 Bellbarn Road, Edgbaston, in the city of Birmingham, England, have invented certain new and useful Improvements in Tire-Presses, of which the following is a specification.

This invention relates to machines in which tires placed in position on collapsible cores are inclosed in a sectional mold and therein subjected to pressure and a vulcanizing temperature for a suitable time. In such machines as heretofore designed, it has been possible to completely collapse the core so that the tire was readily placed in position and removed, but the core when expanded was in substantially the same plane as the tread sections of the mold, which made it very difficult to adjust the tire on the core if adjustment were necessary.

My object therefore is to devise a machine in which the expanded core may be held free of the mold for a sufficient length of time to admit of adjustment of the tire being made.

A further object is to so design the machine that access is readily obtained to the hydraulic rams used in operating the press for the renewal of packings or the making of repairs.

I attain my objects by means of the constructions hereinafter more specifically described and illustrated in the accompanying drawings in which—

Figure 1:
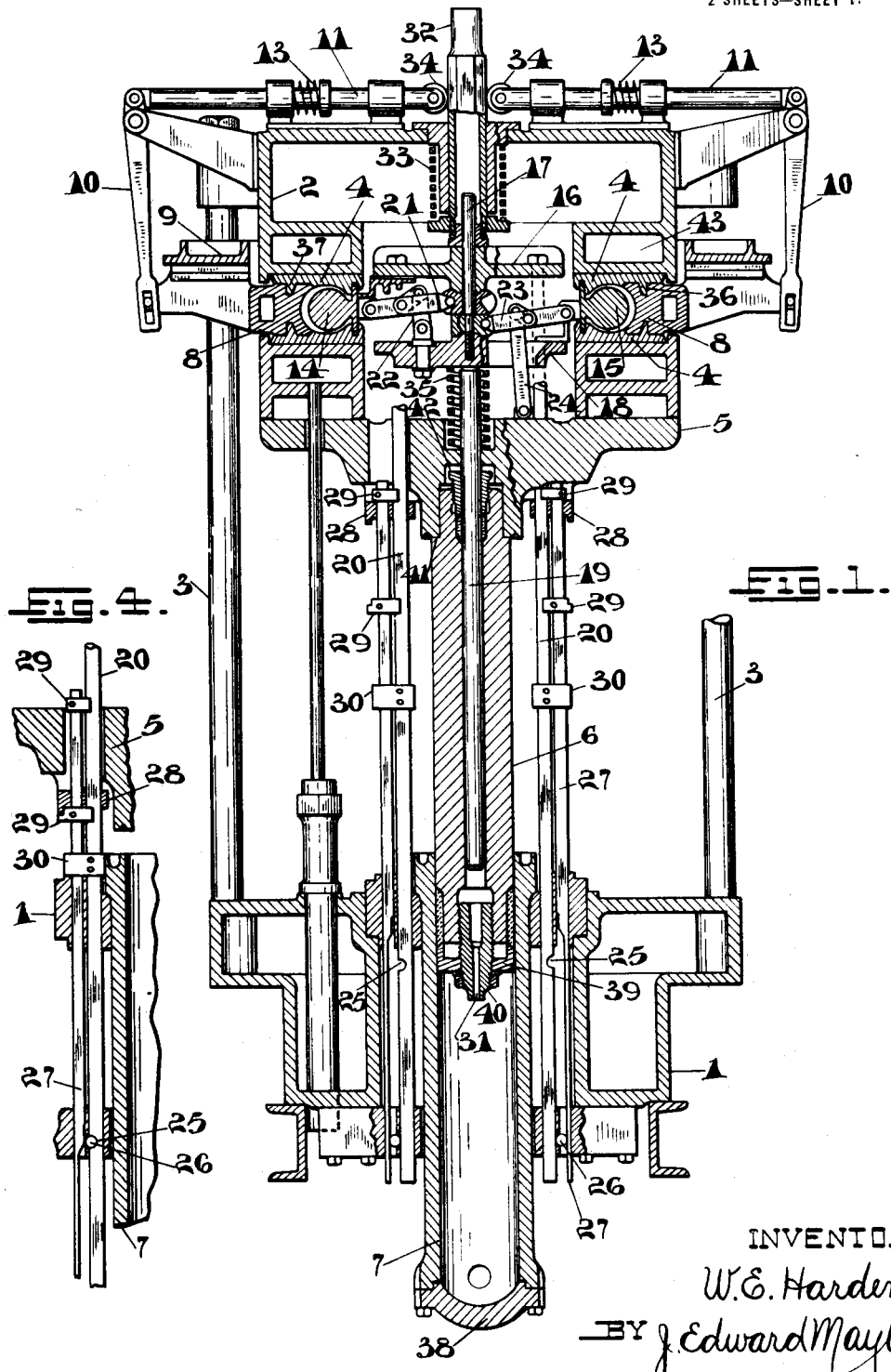
Figure 2:
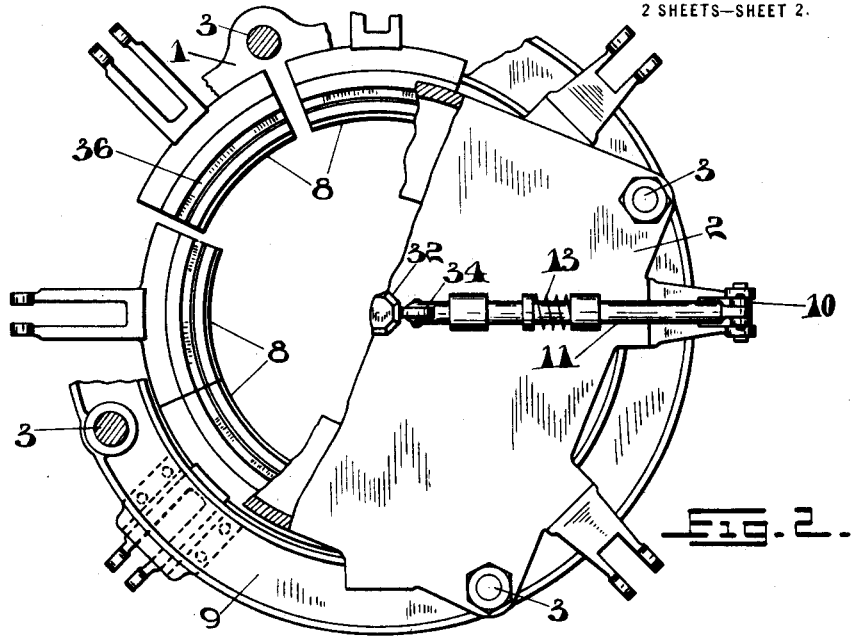
Figure 3:
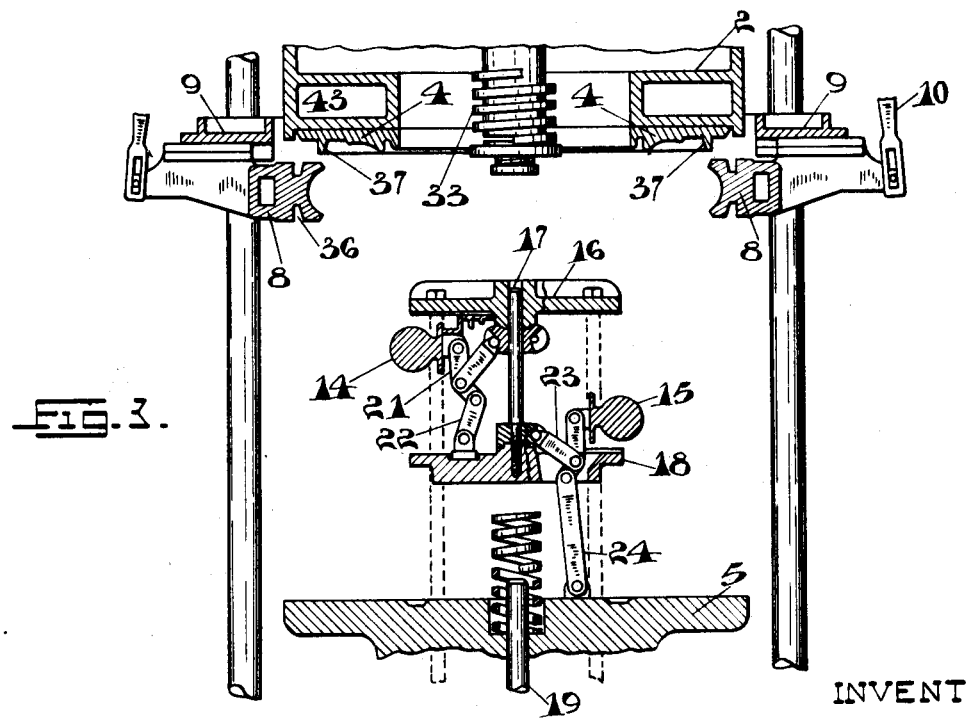

Figure 1 is a vertical section of my improved tire press with the core and mold in coöperating position;

Fig. 2 a plan view of the same partly broken away;

Fig. 3 a vertical section showing parts of the same with the core contracted and out of alinement with the tread sections of the mold, and Fig. 4 a detail of the locking mechanism.

In the drawings like numerals of reference indicate corresponding parts in the different figures.

In its main features this machine resembles known presses, that is to say, a sectional collapsible core is employed which is moved into and out of coöperative position with a sectional mold by means of hydraulic rams.

Referring particularly to Fig. 1, 1 is the base of the machine with which connects the head 2 by means of the tension rods 3. This head 2 carries one of the side wall members 4 of the mold. The head will, as usual be arranged to be heated, as, for example, by the provision of steam space 43. The other side wall member 4 of the mold is carried by the movable head 5, which is secured to the hollow plunger 6 vertically movable in the cylinder 7 secured to the base, into which cylinder fluid pressure will be admitted in the ordinary manner.

The tread member of the tire mold is expansible and contractible, being formed of sections 8 slidably supported on a ring 9 so as to move radially. This ring 9 is vertically slidable on the tension rods 3 of the machine.

For heating purposes, the sections 8 will be provided with steam spaces to which steam is led in the ordinary manner, though of course other heating means might be substituted.

For the purpose of my invention, any means might be provided for regularly moving the sections 8 at the proper time. I show, however, for this purpose the levers 10 fulcrumed on the head 2 and pivotally connected at their upper ends with the radially extending slide rods 11 suitably guided on the head 2. It will be noted that a pin and slot connection is provided between the lower ends of the levers 10 and the sections 8 so as to permit of the vertical movement of these sections as hereinbefore referred to. Springs 13 bearing against a stationary part and against collars secured to the slide rods tend to maintain the sections of the tread mold in their expanded position. The means for actuating the slide rods to move the sections inwardly will be best understood after the construction and arrangement of the other parts of the machine have been described.

The collapsible core comprises two different sets of sections, sections 14 which merely move radially, and sections 15 which move both radially and longitudinally of the machine. The sections 14 are readily slidable on the head 16, which is slidable longitudinally of the machine on the guide rod 17, which is secured to the head 18, which is adapted to be moved toward the head 16 by means of the plunger 19, which operates in the hollow plunger 6. The head 16 has rods 20 secured thereto which pass through holes in the head 18 and the head 5. These rods thus serve as a guide for the head 18. These rods also serve to lock down the head 16 until the core is fully expanded as hereinafter described.

The core sections 14 are expanded and contracted by means of the toggles 21, which are actuated by means of the links 22 from the head 18. The head 18 has the core sections 15 slidably supported thereon. These sections are radially movable by means of the toggles 23 actuated by means of links 24 from the head 5.

At the beginning of the cycle of operations the head 16 is locked in its lower position, as shown in Fig. 4, by the engagement of the notches 25 in the rods 20 with balls or other suitable members 26 movable radially in suitable recesses in parts of the base 1, the balls being retained in position in the notches by the locking slides 27 slidably supported on the base and having their lower portions for a sufficient length cut away so as to permit the balls 26 to move out of the notches 25, while the upper portions of these locking slides are adapted to hold the balls in position in these notches. The locking slides are connected by the head 5, which is provided with apertured lugs 28 in which the locking slides are movable. The slides are provided with spaced collars 29, one at each side of the lug on each rod.

Stops 30 are secured to the rods 20 which are adapted to engage the upper surface of the base 1 so as to stop any downward movement of the head 5 at such time as the notches 25 in the rods are in alinement with the balls 26. These stops may also serve as guides for the locking slides 27.

The general mode of operation of the parts described is as follows. Hydraulic pressure is admitted into the cylinder 7, which causes the simultaneous movement upward of the heads 5 and 18, the head 16 being, however, held by the locking of the rods 20 by the balls 26, the hydraulic pressure acting against the lower end of the hollow plunger 6 and also against the lower end of the plunger 19, a passageway 31 being formed in the lower end of the plunger 6. The joint movement of the heads 5 and 18 causes the expansion of the sections 14 of the core through the operation of the toggles 21. At the same time, the core sections 15 have been moved into alinement with the core sections 14. Further movement of the head 18 is prevented by contact with the head 16. The head 5 is, however, still free to move and continues its upward movement expanding the core sections 15 by means of the toggles 23 until they come into their proper positions relative to the core section 14. As the core is now fully expanded within a tire which was previously placed in position to have the sections 14 expanded within it, and subsequently the sections 15, and as the collapsible core is at this time some distance below the tread sections of the mold, there is ample room for the operator to properly aline the tire on the core if such adjustment be needed.

At this time the lugs 28 engage the collars 29 and release the head 16 so that it is left free to travel upward under the action of the hydraulic pressure on the plungers 6 and 19. There is, however, ample time for the adjustment of the tire on the core before the core is moved into substantial alinement with the tread sections of the mold.

The operation of the tread sections is effected by the following means. A hollow plunger 32 is slidably supported axially of the machine in the head 2. This plunger is normally depressed by a coil spring 33 engaging the plunger in a suitable stationary part. The inner end of this plunger is engageable by a suitable part on the head 16. The upper end of the plunger is tapered as shown to pass between the rolls of other suitable engaging members 34 on the inner ends of the slide rod 11. Now when the expanded core is within about a quarter of an inch of a position in alinement with the tread sections, the head 16 contacts with the plunger. Temporarily this plunger checks the upward movement of the head owing to the resistance due to the spring and to the power required to force its tapered end between the engaging members 34 of the guide rods. This allows the head 5 carrying the lower side wall member of the mold to follow up until the coil spring 35 carried thereby contacts with the head 18. The upward movement of the head 5 is thus checked so as to maintain the side wall member of the mold carried thereby sufficiently spaced from the core and the upper side wall member carried by the head 2 to enable the tread sections 8 of the mold to be moved into position. By this time the spring 33 is sufficiently compressed to overcome the resistance of the middle sections to closing. Almost instantly, by the operation of the levers 10, the tread sections of the mold are forced into position, that is to say, with the tapered annular groove 36 therein in alinement with the annular tapered projections 37 on the side wall members 4 of the mold.

Continued operation of the plungers 6 and 19 forces the side wall members together and draws the tread sections inwardly, thus properly pressing the tire upon the core.

A second object of my invention was to design it for ready accessibility to the hydraulic rams employed. Normally the machine is supported to the base 1 so that the lower end of the cylinder 7 is accessible from below. This end is closed by means of the cap 38 secured in position by suitable cap screws. The lower end of the plunger 6 is provided with a stuffing box of which 39 is the gland, this being formed on or bolted to the plug 40 threaded into the lower end of the plunger. When the cap 38 is removed, the plug is readily rotated to further compress the packing as may be necessary. Through the plug 40 is formed the passageway leading to the interior of the hollow plunger 6. The head 5 is adapted to fit over the upper end of the plunger 6 to rest on a shoulder 41 formed thereon. The head and plunger may thus be readily separated at any time, and in the upper end of the plunger is fitted a stuffing box of which 42 is the gland, which gland is received in a recess in the under side of the head, but which is readily accessible for adjustment when the head and plunger are separated. The maintenance of water tight packings for the plungers is thus rendered very easy.

What I claim as my invention is:—

1. In a tire press, the combination of a vertically movable collapsible core; means for expanding and contracting the core; a sectional mold comprising side wall members and an expansible tread member, said members being relatively movable vertically; means for moving the core in an expanded condition into and out of alinement with the expansible tread member of the mold and for bringing the parts of the mold and the core into and out of coöperative relationship.

2. In a tire press, the combination of a fixed head; a side wall mold member carried by said head; a vertically movable head; a side wall mold member carried by the movable head; an expansible tread member for the mold; a collapsible core; means for supporting and for collapsing and expanding the core including a head movable longitudinally of the machine; means for locking said head to retain the core out of alinement with the tread member of the mold during the expanding operations for the core and for releasing the head after the core is expanded to permit the expanded core to be brought into alinement with the tread member of the mold.

3. In a tire head the combination of a fixed head; a side wall mold member carried by said head; a vertically movable head; a side wall mold member carried by the movable head; an expansible tread member for the mold supported adjacent the fixed head; a sectional collapsible core; an upper core supporting head movable longitudinally of the machine and on which certain of the core sections are radially movable; and a lower core supporting head movable longitudinally of the machine on which the remaining core sections are radially movable; means connected with the lower core supporting head for moving the first mentioned core sections; means connected with the movable mold member supporting head for moving the last mentioned core sections; means for locking said upper core head to retain the core out of alinement with the tread member of the mold during the expanding operations for the core and for releasing the head after the core is expanded to permit the expanded core to be brought into alinement with the tread member of the mold.

4. A tire press constructed substantially as set forth in claim 3 in which the expansible tread member is formed of sections adapted to interlock with the side wall members; and a vertically movable ring is provided on which said sections are radially movable.

5. In a tire head the combination of a fixed head; a side wall mold member carried by said head; a vertically movable head; a side wall mold member carried by the movable head; an expansible tread member for the mold supported adjacent the fixed head; a sectional collapsible core; an upper core supporting head movable longitudinally of the machine and on which certain of the core sections are radially movable; and a lower core supporting head movable longitudinally of the machine on which the remaining core sections are radially movable; means connected with the lower core supporting head for moving the first mentioned core sections; means connected with the movable mold member supporting head for moving the last mentioned core sections; means for locking said upper core head to retain the core out of alinement with the tread member of the mold during the expanding operations for the core and for releasing the head after the core is expanded to permit the expanded core to be brought into alinement with the tread member of the mold; and means actuated by the upper core supporting head to contract the tread member of the mold when the core is brought into substantial alinement therewith.

6. A tire press constructed substantially as set forth in claim 3 in which the expansible tread member is formed of sections adapted to interlock with the side wall member; and a vertically movable ring is provided on which said sections are radially movable; also slide rods and levers adapted to move said sections, a tapered plunger actuable by the upper core supporting head adapted to engage the slide rods to cause the levers to throw the mold sections inwardly, and springs tending to throw them outwardly.

7. A tire press constructed substantially as set forth in claim 3 in which the expansible tread member is formed of sections adapted to interlock with the side wall member; and a vertically movable ring is provided on which said sections are radially movable; also slide rods and levers adapted to move said sections, a tapered cushioned plunger actuable by the upper core supporting head adapted to engage the slide rods to cause the levers to throw the mold sections inwardly, and springs tending to throw them outwardly, and a cushion spring carried by the movable mold carrying head adapted to engage the underside of the lower core supporting head.

Signed at Buffalo this 2nd day of October, 1920.

WILLIAM EDWARD HARDEMAN.